United States Patent
Miyashita et al.

(10) Patent No.: US 6,289,085 B1
(45) Date of Patent: Sep. 11, 2001

(54) VOICE MAIL SYSTEM, VOICE SYNTHESIZING DEVICE AND METHOD THEREFOR

(75) Inventors: Shichiro Miyashita, Yamato; Takashi Saito, Tokyo-to, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/097,867

(22) Filed: Jun. 16, 1998

(30) Foreign Application Priority Data

Oct. 7, 1997 (JP) ................................... 9-184691

(51) Int. Cl.⁷ ............................. H04M 1/64; G10L 13/00
(52) U.S. Cl. ................. 379/88.02; 379/67.1; 379/88.16; 379/88.19; 379/88.27; 379/93.24; 704/258
(58) Field of Search ........................... 379/100.08, 88.13, 379/88.16, 88.2, 88.22, 127, 67.1, 70, 88.02, 88.18, 88.19, 88.21, 88.26, 88.27, 93.24; 704/231, 258

(56) References Cited

U.S. PATENT DOCUMENTS

| | | | |
|---|---|---|---|
| 5,632,002 | * 5/1997 | Hashimoto et al. | 704/231 |
| 5,915,237 | * 6/1999 | Boss et al. | 704/270.1 |
| 6,072,859 | * 6/2000 | Kong | 379/88.16 |
| 6,081,780 | * 5/2000 | Lumelsky | 704/260 |
| 6,144,938 | * 11/2000 | Surace et al. | 704/257 |
| 6,151,491 | * 11/2000 | Farris et al. | 455/412 |

FOREIGN PATENT DOCUMENTS

| | | | |
|---|---|---|---|
| 4-177299 | 6/1992 | (JP) | G10L/3/00 |
| 9-175049 | 6/1992 | (JP) | H04M/3/50 |
| 5-233565 | 9/1993 | (JP) | G06F/15/16 |
| 05260082A | * 10/1993 | (JP) . | |
| 5-260082 | 10/1993 | (JP) | H04L/12/54 |
| 8-272587 | 10/1996 | (JP) | G06F/3/16 |
| 9-050586 | 2/1997 | (JP) | G10L/3/00 |
| 10065811A | * 3/1998 | (JP) . | |
| 11102198A | * 4/1999 | (JP) . | |

* cited by examiner

Primary Examiner—Fan Tsang
Assistant Examiner—Ovidio Escalante
(74) Attorney, Agent, or Firm—Robert P. Tassinari, Jr.

(57) ABSTRACT

The reception part 30 outputs the text and the header of the received electronic mail to the voice synthesizing part 32. The voice font switching part 326 outputs the sander ID contained in the header to the voice font searching part 328. The voice font searching part 328 searches the voice feature data in the voice font database part 330 to have voice feature data in which the user ID contained in the header of the voice feature data matches the sender ID sent to the rhythm control part 322 and the voice generating part 324. The rhythm control part 322, the voice generating part 324 and the voice output part 38 read the content of the text in a voice feature indicated by the phonemes contained in the supplied voice feature data and generates a voice signal characterized by rhythm data contained in the header of the voice feature data for output.

16 Claims, 6 Drawing Sheets

Electronic Mail (Received Data, Transmitted Data)

VOICE MAIL SYSTEM, VOICE SYNTHESIZING DEVICE AND METHOD THEREFOR

FIELD OF THE INVENTION

This invention relates to a voice mail system, a voice synthesizing device and a method therefor for reading the content of an electronic text mail in a voice of a feature inherent to each sender of the electronic mail.

BACKGROUND OF THE INVENTION

There has been a use of a voice mail system which outputs the content of an electronic mail in a voice.

As an example of such voice mail system, Japanese Published Unexamined Patent PUPA 5-260082(reference 1) discloses a first text reading device for providing a voice output of a text by using phonemes of vowel sounds corresponding to an identifier (ID) of the sending side and a second text reading device in which the sending terminal sent an electronic mail with a parameter included therein and the receiving terminal provided a voice output of a text by using the received parameter.

However, the first text reading device disclosed in the reference 1 had to register phonemes in correlation to the ID of the sending side in each of the terminals so that it was cumbersome to set the phonemes and it was hard to change the setting once the phonemes has been set in the terminal.

It addition, the first text reading device selected phonemes of only the vowel sounds for voice output of the text so that it was not capable of providing a voice output of a text in a voice feature including a consonant inherent to each of users who sent an electronic mail.

In addition, because the first text reading device can correlate only one sender ID to only one set of phonemes, it is necessary to register in each terminal a plurality of phonemes of the same content with only the sender ID altered when the user who sent an electronic mail having a plurality of IDs attempts to voice output in a same voice feature using whatever ID so that resource in the terminal devise is wasted and the number of phonemes which can be registered is reduced.

Further, the second text reading device disclosed in the reference 1 sends an electronic mail with phonemes of vowel sounds and a pitch of the voice of the sending user included therein so that the data quantity of the electronic mail tends to increase and invites a congestion in the communication network.

Further, once the voice feature data has been spread over the terminals within the network, it is difficult to limit the use of the voice feature data and the voice feature data may be used by an unauthorized third party leading to a disadvantage of the author of the voice feature data.

Further, there may be a need to limit the usable range of the voice feature data to prevent unsuitable occasion from taking place such as voice outputting the mail to a customer in a casual rhythm, for example, when there is a possibility that a voice feature data in a casual rhythm is stored in the customer's terminal device.

Therefore, it is an object of this invention to provide a voice mail system, a voice synthesizing device and a method therefor in which the voice feature in the voice output of an electronic mail is easily set up while a text can be outputted in a voice in a voice feature inherent to each of users who sent the electronic mail.

It is another object of this invention to provide a voice mail system, a voice synthesizing device and a method therefor which is capable of outputting a text in a voice of a voice feature inherent to each of users who sent the electronic mail without adding to each of electronic mails data (voice feature data) indicating the voice feature of the voice when outputted.

It is another object of this invention to provide a voice mail system, a voice synthesizing device and a method therefor in which each voice feature data may be shared with any number of sending IDs while preventing waste of resources of terminals caused by registering a plurality of same voice feature data even when the same user has a plurality of IDs and allowing many voice feature data to be registered in each of terminals.

It is another object of this invention to provide a voice mail system, a voice synthesizing device and a method therefor which can limit the use of voice feature data to a given time period even after the voice feature data have been spread over the network for preventing disadvantages to the author caused by an unauthorized use by a third party.

It is another object of this invention to provide a voice mail system, a voice synthesizing device and a method therefor which can limit the usable range of the voice feature data to prevent unsuitable use of the voice feature data.

BRIEF DESCRIPTION OF THE INVENTION

To achieve the above objects, a mode of the voice mail system of this invention (a first voice mail system) provides a voice mail system comprising a plurality of terminal devices connected through a network as communication nodes, in which said terminal devices each comprising; voice feature control means for controlling each of said voice feature data which indicates each of voice features of a plurality of voices in correlation with one or more identifier which are unique within the network, mail reception means for receiving a mail containing at least a communication message and said identifier, voice synthesizer means for synthesizing a voice which represents the content of the communication message contained in the received mail in a voice feature indicated by said voice feature data which is controlled in correlation with said identifier contained in the received mail, and voice output means for outputting said synthesized voice.

Another mode of the voice mail system of this invention (a second voice mail system) provides a voice mail system comprising one or more terminal devices and one or more voice mail server devices connected through a network as communication nodes, in which said voice mail server device comprising; voice feature control means for controlling each of said voice feature data which indicates each of voice features of a plurality of voices in correlation with one or more identifiers which are unique within the network, mail reception means for receiving a mail containing at least a communication message and said identifier, voice synthesizer means for synthesizing a voice which represents the content of the communication message contained in the received mail in a voice feature indicated by said voice feature data which is controlled in correlation with said identifier contained in the received mail, and voice output means for outputting said synthesized voice to one or more of said plurality of terminal devices in response to a request from one or more of said plurality of terminal devices.

In another mode of the voice mail system of this invention, each of said terminal devices is provided with mail sending means for sending said mail to other communication node through said network.

In another mode of the voice mail system of this invention, said mail contains at least a communication message and said identifier of the sending party and said voice synthesizer means synthesizes a voice representing the content of the communication message contained in said received mail in a voice feature which said voice feature data indicates in correlation with said identifier of the sending party contained in said received mail.

Another mode of the voice mail system of this invention further comprises voice data extracting means for extracting voice feature data indicating each of voices inputted and sending it to each of said communication nodes through said network in correlation with one or more identifiers each being unique within said network, and said voice feature data control means receiving said extracted voice feature data through the network for controlling the received voice feature data in correlation with one or more identifiers which are unique within the network.

In another mode of the voice mail system of this invention, each of said communication nodes comprises clock means for measuring an operating time, each of said voice feature data including time limit data indicating the limit of using that voice feature data, and said voice synthesizer means synthesizing the voice using said voice feature data only when said operating time is within the use limit indicated by said time limit data contained in said voice feature data.

In another mode of the voice mail system of this invention, said mail containing an identifier of the destination, each of said voice feature data containing use permission data which indicates the identifier of the destination which is permitted to use that voice feature data, and said voice synthesizer means synthesizing the voice using said voice feature data when the identifier of the destination contained in said mail is the identifier of the destination which said use permission data permits to use.

In a first voice mail system of this invention, a plurality of terminal devices connected through a communication network capable of data communication such as a telephone network, an ISDN network or a LAN mutually transmit electronic mails and output in a voice in a voice feature inherent to each user who sent the electronic mail.

In a second voice mail system of this invention, a plurality of terminal devices send an electronic mail to a voice mail server device connected through said communication network and said voice mail server device reads the text of the received electronic mail in a voice of a voice feature inherent to the user who sent the electronic mail for transmission to the terminal device which issued the request.

The voice feature extracting means extracts, for example, phonemes of vowel sounds and consonants from the voice inputted by the user and generates voice feature data (voice font) which makes data indicating the voice feature of a voice inherent to a user (phonemes) to be handled as if it is a character font for each user by adding voice character data which indicates the language of the voice, the sexuality and the age to the extracted phonemes and correlating it with the identifier (ID) of each user which is unique in the network.

Said terminal device and voice mail server device are computers having voice processing functions and have functions to measure the date, hour and minute (time) of operation like a conventional computer. In the terminal device and the voice mail server device, the voice feature data control means stores and controls voice feature data which the voice feature data extracting means correlated to the ID of each user.

The mail reception means receives an electronic mail sent from a terminal device through a communication network which contains a communication message (text), an identifier of a sending party (a user ID who sent an electronic mail), time limit of use (time limit data) and an identifier of a destination having a use permission (use permission data), including a mail packet which is used in the intranet or the internet, for example.

The voice synthesizer means obtains voice feature data indicated by the user ID which is separated by the mail reception means from the voice feature data control means to synthesize the voice of the feature indicated by the obtained voice feature data and outputs the content of the text contained in the electronic mail in a voice.

In addition, the voice synthesizer means treats a voice feature data as a valid one for use in voice synthesis to limit an unlimited use of the voice feature data, only when the date, hour and minute (time) to synthesize a voice is within a time period which is indicated by the time limit data contained in the voice feature data or only at the destination indicated by the use permission data.

In the terminal device, the voice output means outputs a voice synthesized by the voice synthesizer means to a user of the terminal device in the receiving side through a speaker provided in the terminal device.

The mail send means sends said electronic mail to other terminal device or a voice mail server through the network.

In the second voice mail server device of this invention, when, for example, a user who wishes to receive a mail manipulates either on of terminal devices to set up a call to the voice mail server and requests delivery of the mail by inputting a user ID and a password, the voice output means controls the voice synthesizer means to have it output in a voice the content of the text of an electronic mail addressed to this user and delivers it via a communication network to the terminal device which the user manipulates.

The voice synthesizer means of this invention for synthesizing a voice of a communication message of a mail containing at least a communication message and said identifier comprising; voice feature data control means for controlling each of voice feature data indicating each voice feature of a plurality of voices in correlation with one or more identifiers which are unique within the network which transmits said mails and voice synthesizer means for synthesizing a voice representing the content of a communication message contained in the received mail in a voice feature indicated by said voice feature data which is controlled in correlation with said identifier.

The voice mail communication method of this invention controls each voice feature data indicating each voice feature of a plurality of voices in correlation with one or more identifiers which are unique within the network, receives a mail containing at least a communication message and one or more identifiers and synthesizes a voice representing the content of a communication message contained in the received mail in a voice feature indicated by said voice feature data which is correlated to said identifier contained in said received mail.

The voice synthesizing method of this invention for synthesizing a voice of a communication message of a mail which contains at least a communication message and said identifier comprising: controlling each voice feature data indicating each voice feature of a plurality of voices in correlation with one or more identifiers which are unique within the network which transmit each of said mails and synthesizing a voice representing the content of a communication message contained in the received mail in a voice feature indicated by said voice feature data which is controlled in correlation to said identifier.

The computer readable recording medium records therein a program for causing the computer to execute the steps of; controlling each voice feature data indicating each voice feature of a plurality of voices in correlation with one or more identifiers which are unique within the network and synthesizing a voice representing the content of a communication message contained in the received mail in a voice feature indicated by said voice feature data which is correlated to said identifier contained in said received mail.

DETAILED DESCRIPTION OF THE INVENTION

Configuration of Voice Mail System 1

Figure 1:
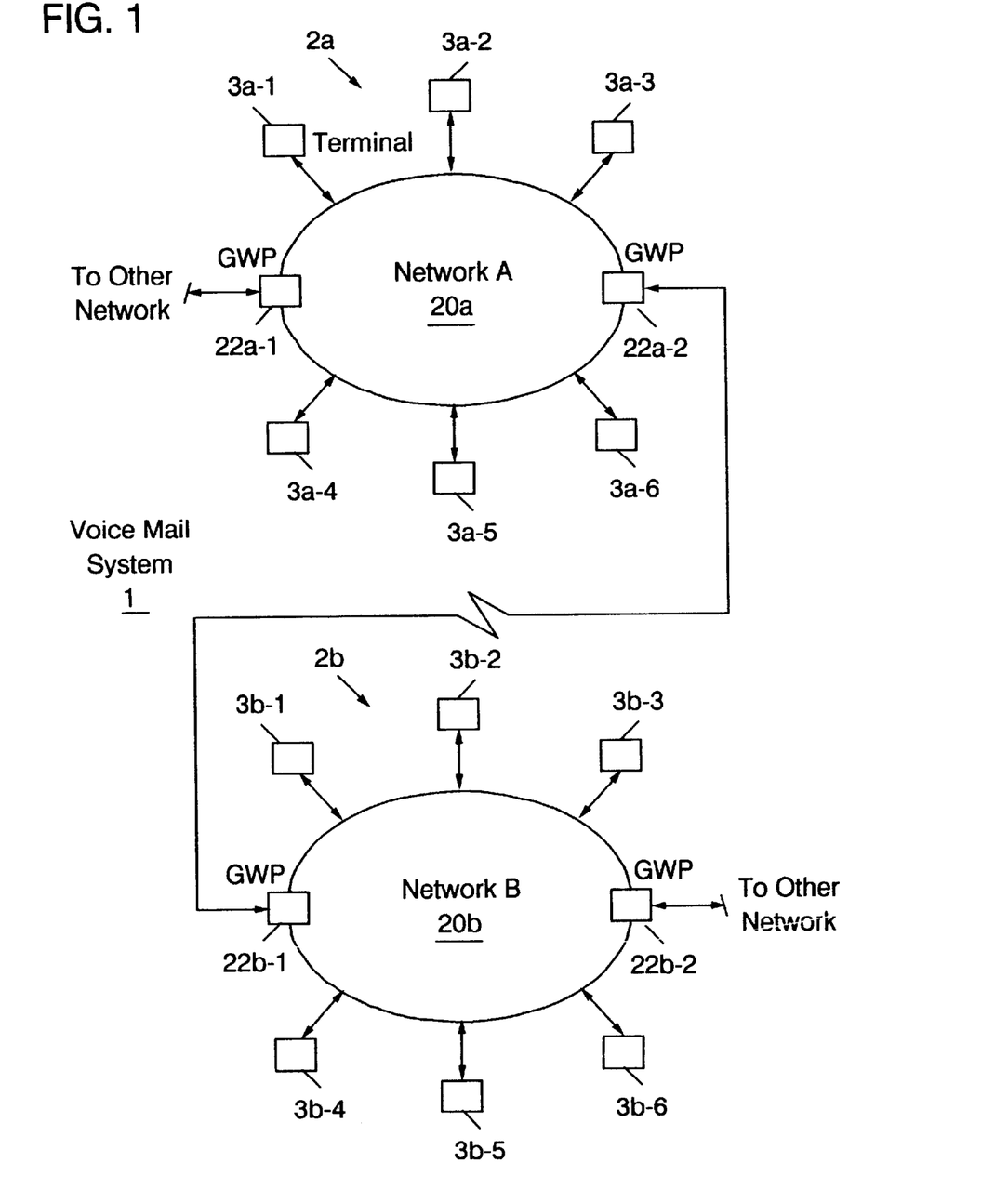
FIG. 1 is a schematic diagram of a voice mail system shown as a first embodiment of this invention.

FIG. 1 is a schematic diagram of the voice mail system 1 shown as a first embodiment of this invention.

As shown in FIG. 1, the voice mail system 1 comprises one or more networks, for example, communication networks 2a, 2b (network A, network B).

The communication networks 2a, 2b include as communication nodes, gateway processors (GWP) 22a-1, 22a-2, 22b-1, 22b-2 which interconnect communication networks such as an ISDN communication network, a telephone network and an LAN, communication networks 2a, 2b and other networks (not shown), and a plurality of terminal device 3a-1, 3a-m, 3b-a, 3b-n (m,n are an arbitrary number, In FIG. 1, the case of m, n=6 is shown as an example) which are connected to the communication networks 20a, 20b.

The voice mail system 1 transmits electronic mails among a plurality of terminal devices (the plurality of terminal devices are collectively called a terminal device 3 when any specific one is meant) and outputs the text portion of the electronic mail in a voice by these components.

Configuration of Terminal Device 3

The configuration of the terminal device 3 will now be described hereunder.

Figure 2:
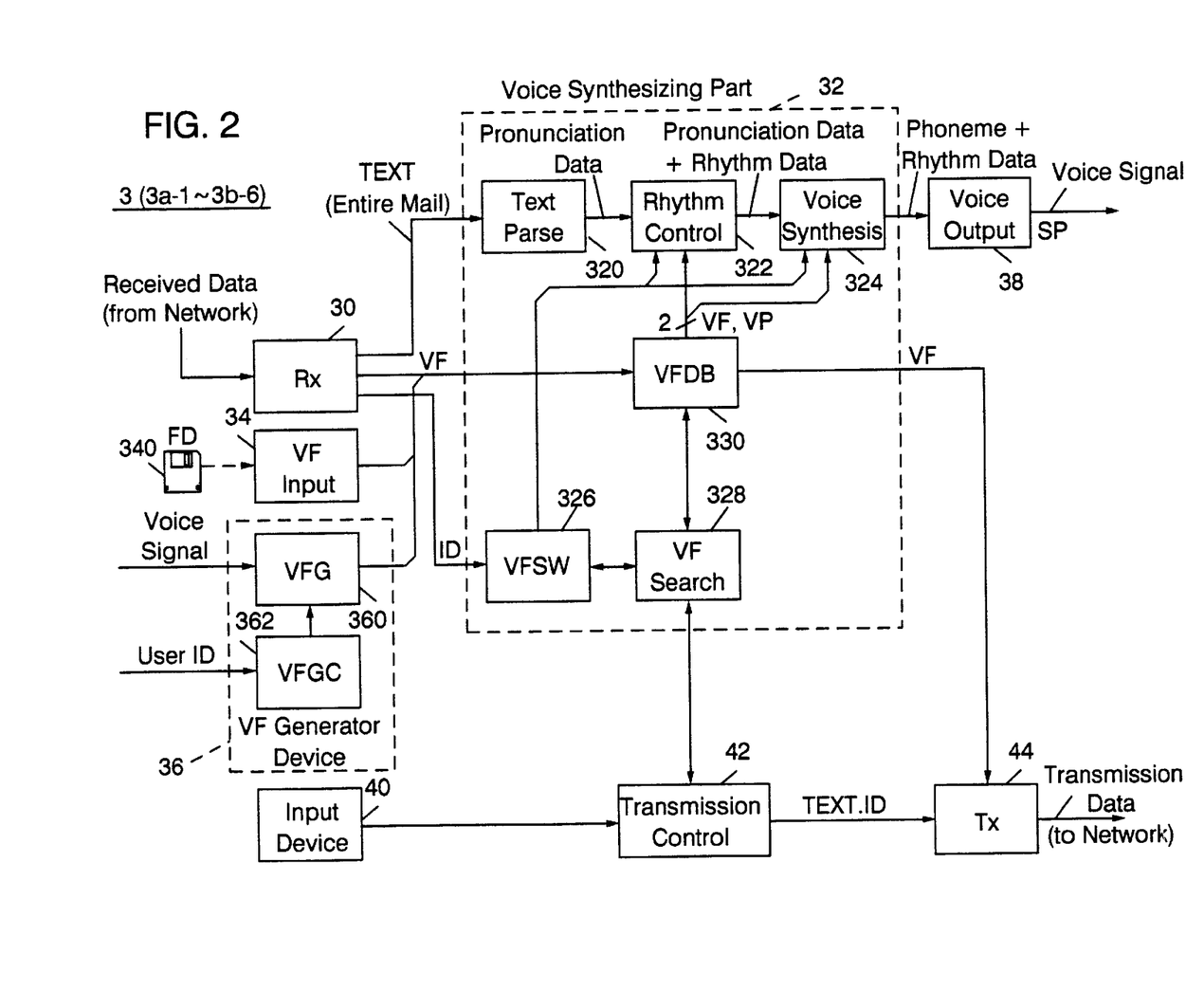
FIG. 2 is a diagram showing the configuration of the terminal device shown in FIG. 1.
Figure 3:
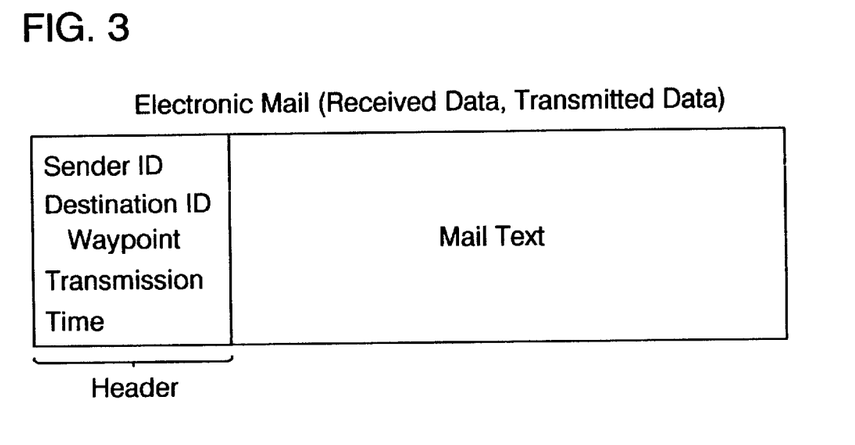
FIG. 3 is a diagram showing the structure of an electronic mail transmitted between the terminal devices shown in FIG. 1 and FIG. 2.

FIG. 2 is a diagram showing the configuration of the terminal device shown in FIG. 1 (a-1, ... a-6, 3b-1, ... 3b-6), FIG. 3 is a diagram showing the structure of an electronic mail transmitted between the terminal devices 3 shown in FIG. 1 and FIG. 2.

As shown in FIG. 2, the terminal device 3 is a multimedia computer having a function to measure year/month/date and hour/minute (a clock) and a voice output function and comprises a reception part (RX) 30, a voice synthesizer part 32, a voice font (VF) input part 34, a voice font generator device 36, a voice output part 38, an input device 40 having a keyboard and a mouse, a transmission control part 42 and a transmission part (TX) 44. Among components of the multi media computer of the terminal 3, those which are not directly relevant to the explanation of this invention, such as a hard disk device and a monitor are omitted in FIG.2.

The voice synthesizer part 32 comprise a text parsing part 320, a rhythm control part 322, a voice generation part 324, a voice font database part (VFDB) 330, a voice font switching part (VFSW) 326 and a voice font searching part 328.

The voice font generator device 36 comprises a voice font generating part (VFG) 360 and a voice font generator control part (VFGC) 362.

The terminal device 3 sends an electronic mail which contains data including an identifier of the sending party (sending ID), a destination ID, a way node and year/month/date/hour/minute of the electronic mail sent in the header portion and a communication message (text) in the mail text portion to other terminal 3 through the communication networks 2a, 2b as a transmitted data.

The terminal device 3 each receives an electronic mail (FIG. 3) as data received from the other terminal device 3 through the networks 2a, 2b and outputs the content of the text contained in the mail text portion of the electronic mail in a voice of a feature corresponding to each sender identifier (ID) contained in the header, for example, in a voice of the user who sent the electronic mail,

Components of the Terminal Device 3

The components of the terminal device 3 shown in FIG. 2 will now be described hereunder.

Reception Part 30

The reception part 30 which comprises an ISDN channel adapter (TA; terminal adapter) when the connected communication networks 2a, 2b are ISDN communication network, a reception part of a modem when the connected network is a telephone network, and a reception part of LAN connection port when the connected network is a LAN, receives and opens the electronic mail (FIG. 3) inputted as data received from the communication networks 2a, 2b, separates the text (TEXT) contained in the opened electronic mail for output to the text parsing part 320 and separates the sender ID contained in the header (HEADER) for output to the voice font switching part 326.

The reception part 30 also separates the voice feature data from the electronic mail when the received electronic mail contains voice feature data and outputs it to the voice font database part 330.

The voice feature data includes, for example, phonemes representing parameters (spectrum and waveform information) extracted from vowel sounds (a, i, u, e, o in Japanese) and consonants (s, t, n, h, m, y, r, w, g, z, d, b, p, etc.) contained in the voice of an arbitrary user of the voice mail system 1 which is added with header data shown below. The header data includes voice character data (language, wGender, wAge) indicating the language, personality and age, etc., which are used for giving a character to the voice.

The voice feature data is also called a voice font because it characterizes the voice feature of the synthesized voice in the manner similar to the font data which characterizes the shape of a character.

TABLE 1

(Structure of header data of a voice feature data)

```
typedef struct{//ttsmi
GUID            gEngineID;
TCHAR           szMfgName [TTSI_NAMELEN];
TCHAR           szProductName [TTSI_NAMELEN];
GUID            gModeID;
TCHAR           szModeName [TTSI_NAMELEN];
LANGUAGE        language;
TCHA            szSpeaker [TTSI_NAMELEN];
TCHAR           szStyle [TTSI_NAMELEN];
WORD            wGender
WORD            wAge
DWORD           dwFeatures
DWORD           dwInterfaces
DWORD           dwEngineFeatures
TCHAR           szMailID [TTSI_MAILIDLEN];
} TISMODEINFO, *PTTSMODEINFO;
```
where, GUID, WORD, DWORD, LANGUAGE indicate the type of pre-fined data,
  TTSI_NAMELEN indicates the length of characters of a name,
  TTSI_MAILIDLEN indicates the maximum value of the length of characters of, AILID,
  gEngineID:      the identifier (ID) unique to the device for generating voice feature data or a device for synthesizing a voice (voice synthesizing engine),
  szMfgName:      the name of the manufacturer of the device (engine), (for example, zzz Corporation),
  szProductName:  the name of the device (engine), (for example, "zzz's vvv"),
  gModeID:        the identifier (ID) of the operation mode in the case where there are a plurality of operation modes in the device,
  szModeName:     the identifier (ID) of a processing mode in the case where there are a plurality of processing modes in the voice synthesizer processing,
  language:       a language of the voice to be synthesized (e.g., Japanese, English, etc.)
  szSpeaker:      the name of the phoneme (e.g., the user who sends an electronic mail)
  szStyle:        the personality of the voice (e.g., "Business, Casual, Computer, Excited, SingSong"),
  wGender: sexuality of the voice
          [example,   "GENDER_FEMALE (female)",
                      "GENDER_MALE (male)",
                      "GENDER_NEUTRAL (a voice which is neither a mail nor a female)"]
  wAge: The age of the voice
          [example,   "TISAGE_BABY (about 1 years old)",
                      "TISAGE_TODDLER (about 3 years old)",
                      "TISAGE_CHILD (about 6 years old)",
                      "TISAGE_ADOLESCENT (about 14 years old)",
                      "TISAGE_ADULT (about 20 TO 60 years old)",
                      "TISAGE_ELDERLY (above about 60 years old)"]
  dwFeatures: identifier (ID) of a voice synthesizing function available in the device (engine)
          [example,   "TISFERATURE_ANYWORD (read any word)",
                      "TISFERATURE_IPAUNICODE (support to International Phonetic Alphabet (IPA) phonetic symbol)",
                      "TISFERATURE_PCOTIMIZED (optimization of the feature of a voice)".
                      "TISFERATURE_PHONEOPTIMIZED (usable in telephone network of 8 kHz sampling rate)",
                      "TISFERATURE_PITCH (pitch adjustment)",
                      "TISFERATURE_SPEED (speed adjustment)",
                      "TISFERATURE_TAGGED (control by a tag text)",
                      "TISFERATURE_VISUAL (providing shape information of mouth),
                      "TISFERATURE_VOLUME (volume adjustment)",
                      "TISFERATURE_WORDPOSITION (reporting the position of a word being read)",
  dwInterfaces: interface which the device (engine) supports
          [example,   "TISI_ILEXPRONOUNCE (ILexPromounce interface)",
```

TABLE 1-continued (Structure of header data of a voice feature data)

```
                      "TISI_ITTSATTRIBUTES (ITTSAttributes interface)",
                      "TISI_ITTScentral (ITTSCentral interface)",
                      "TISI_ITTSDIALOGS (ITTSDialogs interface)",
  dwEngineFeatures: characteristic unique to the device (engine)
          [example,   "TISFEATURE_SPEED (speed adjustment)",
                      "TISFEATURE_TAGGED (control by tagged text)",
                      "TISFEATURE_VISUAL (providing the shape information of mouth)",
                      "TISFEATURE_VOLUME (volume adjustment)",
                      "TISFEATURE_WORDPOSITION (reporting the position of the word being read)",
  szMailID: one or more user ID related to voice feature data
          [example,   intra-company network (intranet) ID (xxx/www/zzz) and internet ID (xxx@yyy.zzz.com) of a same user]
```

Voice Synthesizer Part 32

The voice synthesizer part 32 synthesizes a voice representing the content of the text using phonemes and voice character data which are contained in the voice feature data corresponding to the sender ID contained in the header of the electronic mail (FIG. 3) which is inputted from the reception part 30 and outputs the voice.

Voice Font Database Part 330

In the voice synthesizer part 32, the voice font database part 330 stores and controls the voice feature data inputted from the reception part 30, the voice font input part 34 and the voice font generator device 36 and outputs the voice feature data to the rhythm control part 322, the voice generating part 324 and the transmission part 44 under the control of the voice font search part 328.

Text parsing Part 320

The text parsing part 320 parses the text inputted from the reception part 30 and outputs data representing the reading of the text to the rhythm control part 322. Specifically, for example, when a series of Japanese characters "音声合成 (Voice Synthesis)" is included in the text inputted from the reception part 30, the text parsing part 320 parses the series of characters "onsei gousei" to generate pronunciation data giving reading and accent "o.n.se.-.go'.-.se.-." (indicates the position of accent) for output to the voice generating part 324.

Rhythm Control Part 322

The rhythm control part 322 adds rhythm data which gives a rhythm characteristic of the voice to the pronunciation data inputted from the text parsing part 320 for output to the voice synthesizing part 324, based on the voice character data contained in the header data shown in the table 1 among the voice feature data which was inputted from the voice font database part 330 and switched by the voice font switching part 326.

Voice Generating Part 324

The voice generating part 324 correlates the phonemes contained in the voice feature data which is inputted from the voice font database part 330 and switched by the voice font switching part 326 with the pronunciation data inputted from the text parsing part 320 through the rhythm control part 322 for output to the voice output part 38.

Voice Font Switching Part 326

The voice font switching part 326 controls the voice font searching part 328 based on the sender ID of the electronic mail (FIG. 3) inputted from the reception part 30 to have the searching part search the voice feature data in the voice font database part 330.

In addition, the voice font switching part 326 controls the rhythm control part 322 and the voice synthesizing part 324 based on the result of the search so as to switch the voice feature data used for processing to a voice feature data corresponding to the sender ID supplied from the voice font database part 330 when there is voice feature data corresponding to the sender ID in the voice font database part 330 while switching the voice feature data used for processing to a voice feature data which is used for absence of the voice feature data corresponding to the sender ID(default voice feature data) when there is no voice feature data corresponding to the sending ID.

Voice Font Search Part 328

The voice font search part 328, responsive to the control of the voice font switching part 326, searches the voice feature data which is stored and controlled in the voice font database part 330 and controls the voice font database part 330 to supply the voice feature data corresponding to the sender ID to the rhythm control part 322 nd the voice generating part 324 when there is voice feature data corresponding to the sender ID while controlling the voice font database part 330 to supply the default voice feature data to the rhythm control part 322 and the voice generating part 324 when there is no voice feature data corresponding to the sending ID.

In addition, the voice font search part 328 searches voice feature data which is stored and controlled in the voice font database part 330 in response to the control of the transmission control part 42 when the user inputted a destination ID and the user ID to the input device 40 and instructs the transmission control part 42 to send voice feature data corresponding to the user ID which the user inputted for other terminal device 3 and, when there is voice feature data corresponding to the user ID, controls the voice font database part 330 to have it supply voice feature data corresponding to the user ID to the transmission part 44.

Voice Output Part 38

The voice output part 38 generates a voice signal which characterizes a voice represented by phonemes correlated to pronunciation data by voice generating part 324 based on voice character data correlated to pronunciation data by the rhythm control part 322 for outputs to a speaker (SP:not shown) provided in the terminal device 3.

Voice Font Input Part 34

The voice font input part 34 is, for example, a floppy disk device which reproduces voice feature data recorded on a recording medium such as a floppy disk for output to the voice font database part 330.

Voice Font Generator Device 36

The voice font generator device 36 generates voice feature data having header data shown in the table 1 for output to the voice font database part 330. The voice font generator device 36 may be separate from the reception part 30. The voice feature data generated by the voice font generator device 36 which is separated from the terminal device 3 is supplied to each terminal device 3 through communication networks 20a, 20b or a recording medium 340.

Voice Font Generation Control Part 362

The voice font generator device 36, the voice font generation control part 362 receives a user ID (szmailID in Table 1) and other header data which are externally inputted and outputs them to the voice font generating part 360.

The voice font generation control part 362 controls the voice font generating part 360 in response to user's manipulation to have it extract phonemes from the voice signal externally inputted and generate voice feature data.

Voice Font Generating Part 360

The voice font generating part 360, in response to the control of the voice font generation control part 362, extracts phonemes from a voice signal of a user which is externally inputted and further generates voice feature data by adding header data inputted from the voice font generation control part 36 to the extracted phonemes for output to the voice font database part 330.

The transmission control part 42 generates an electronic mail when the user inputs a destination ID and the content of the text to the input device 40 and instructs to send the electronic mail (FIG. 3) and sends the electronic mail to the destination terminal device 3 through the transmission part 44 and the communication networks 2a, 2b (FIG. 1).

The transmission control part 42 controls the transmission part 44 to have it send an electronic mail containing voice feature data as a text to other terminal 3 when the user instructs to send voice feature data as described in the above.

Transmission part 44

The transmission part 44 includes a transmission part of an ISDN channel adapter (TA) when the connected communication networks 2a, 2b are, for example, an ISDN communication network while it includes a transmission part of a modem when the connected communication networks are a telephone network, The transmission part 44 includes a transmission part of a LAN connection board when the connected communication networks are LAN. The transmission part 44 sends an electronic mail in inputted from the input device 40 to other terminal 3 through the communication networks 2a, 2b.

The transmission part 44 also generates an electronic mail containing voice feature data in the text in response to the input control device 40 for sending to other terminal 3 through the communication networks 2a, 2b.

Operation of the Voice Mail System 1

The operation of the voice mail system 1 will now be described hereunder by taking as an example a case where the terminal device 3a-1 FIG. 1, FIG. 2) prepares voice feature data and sends the voice features data and an electronic mail to the terminal 3b-1 while the terminal 3b-1 outputs the electronic mail received from the terminal device 3a-1 in a voice feature indicated by the received voice feature data.

Preparation of Voice feature Data

The operation where the terminal device 3a-1 prepares voice feature data is first described. The user performs a predetermined manipulation to the voice font generation control part 362 of the voice font generator device 36, instructs to prepare voice feature data and further inputs a user ID and other voice character data (Table 1) which correlate the voice feature data to phonemes.

The voice font generation control part 362 prompts the user to input a voice which is necessary to extract phonemes of a vowel sound and a consonant and further controls the voice font generating part 360 to have it receive user's voice.

The user pronounces in response to an indication prompting to input a voice by the voice font generation control part 362 and inputs the voice to the voice font generation control part 362 through a microphone (not shown) while the voice font generation control part 362 converts the inputted analog voice to voice data of a digital form for storage.

In addition, when input of the voice to the voice font generating part 360 ends, the user performs a predetermined manipulation to the voice font generation control part 362 and notifies completion of the voice input.

The voice font generating part 360 controls the voice font generation control part 362 in response to the notification of completion of user's voice input to have it extract a cepstrum parameter from the stored voice data to generate phonemes. In addition, the voice font generating part 360 controls the voice font generation control part 362 to have it prepare voice feature data by correlating the user ID and other voice character data with the prepared phonemes for output to the voice font database part 330.

The voice font database part 330 records the voice feature data inputted from the voice font generation control part 362 and controls the recorded voice feature data.

Transmission of Voice feature Data

Next, the operation where the terminal device 3a-1 in the communication network 2a sends an electronic mail (FIG. 3) which contains voice feature data in the mail text portion to the terminal device 3b-1 and other terminal device 3 in the communication network 2b is described.

First of all, the user of the terminal device 3a-1 manipulates the input device 40 of the terminal device 3a-1 to input the electronic mail address of the destination (the terminal device 3b-1 and other terminal device 3) and a user ID indicating the voice feature data to be sent and instructs to send the voice feature data to the terminal device 3a-1.

The input device 40 receives instruction to send the electronic mail address, the user ID and the voice feature data inputted by the user for output to the transmission control part 42.

The transmission control part 42 outputs the electronic mail address of the terminal device 3a-1 as a sending ID, and the electronic mail address of the terminal device 3b-1 and other terminal 3 as a destination ID to the transmission part 44. The transmission control part 42 also outputs the user ID indicating the voice feature data to the voice font searching part 328 of the voice synthesizer part 32 and further controls the voice font searching part 328 to have it search the voice feature data which contains the outputted user ID in the header data as szMailID (Table 1).

The voice font searching part 328, responsive to the control of the transmission control part 42, searches the voice feature data containing the inputted user ID in the voice feature data which the voice font database part 330 stores and controls, and controls the voice font database part 330 to have it output the corresponding voice feature data to the transmission part 44.

The transmission part 44 multiplexes the sender ID and the destination ID inputted from the transmission control part 42 together and the voice feature data obtained as a result of the search into the mail text portion to prepare an electronic mail for individually sending or broadcasting to the terminal device 3b-1 and other terminal device 3 through the communication networks 20a, 20b.

Reception of the Voice feature Data

The operation where the terminal device 3b-1 in the communication network 2b sends an electronic mail (FIG. 3) which contains voice feature data sent from the terminal device 3a in the communication network 2a is next described.

The reception part 30 of the terminal device 3b-1, upon receiving an electronic mail containing voice feature data transmitted from the terminal device 3a-1, checks the content of the mail text portion of the electronic mail and, when voice feature data is contained, separates voice feature data (VF) from the received electronic mail for output to the voice font database part 330.

The voice font database part 330 stores and controls voice feature data inputted from the reception part 30.

Transmission of Electronic Mail

The operation where the terminal device 3a-1 in the communication network 2a sends an electronic mail (FIG. 3) to the terminal device 3b-1 in the communication network 2b is next described.

First of all, the user of the terminal device 3a-1 manipulates the input device 40 of the terminal device 3a-1 to input the electronic mail address of the destination (terminal device 3b-1) and a communication message (text data other than voice feature data) and instructs the terminal device 3a-1 to send the electronic mail to the terminal device 3b-1.

The input device 40 receives the electronic mail address, communication message and instruction to send a mail which are inputted by the user and outputs them to the transmission control part 42.

The transmission control part 42 outputs the electronic mail address of the terminal device 3a-1 as a sender ID, the electronic mail address of the terminal device 3b-2 as a destination ID, and the communication message as the text, respectively, to the transmission part 44.

The transmission part 44 multiplexes the sender ID and the destination ID inputted from the transmission control part 42 into the header portion while multiplexing the text into the mail text portion of the electronic mail to prepare an electronic mail and outputs it to the terminal device 3b-1 through the communication networks 20a, 20b.

Reception of Electronic Mail, Voice output

The operation where the terminal device 3b-1 in the communication network 2b receives an electronic mail (FIG. 3) sent by the terminal device 3a-1 in the communication network 2a and outputs it in a voice.

The reception part 30 of the terminal device 3b-1, upon receiving an electronic mail which contains a communication message transmitted from the terminal device 3a-1, checks the content of the text data of the electronic mail and, when the voice feature data is not contained in the text data, separates the communication message from the received electronic mail for output to the text parsing part 320 of the voice synthesizing part 32 as a text. The reception part 30 of the terminal device 3b-1 further separates the sender ID from the header for output to the voice font switching part 326.

The voice font switching part 326 outputs the sender ID inputted from the reception part 30 to the voice font searching part 328 and controls the voice font searching part 328 to have it search the voice feature data in the voice font database 330.

The voice font searching part 328 searches the voice feature data in the voice font database 330 under the control of the voice font switching part 326 and controls the voice font database part 330 according to the result of the search to control the voice font database part 330 for having it supply voice feature data corresponding to the sender ID when voice feature data in which the user ID (szMailID; Table 1) contained in the header matches the sender ID inputted from the voice font switching part 326, while having the voice font database part 330 supply default voice feature data to the rhythm control part 322 and the voice generating part 324 when the voice feature data corresponding to the sender ID does not exist.

The voice font switching part 326 controls the rhythm control part 312 and the voice generating part 324 such that the voice font switching part 326 switches to the voice feature data corresponding to the sender ID when there is voice feature data corresponding to the sender ID in the voice font database part 330 while it switches to default voice feature data when the voice feature data corresponding to the sender ID does not exist.

The rhythm control part 322 adds rhythm data indicating a rhythmical characteristic of a voice to the pronounced data inputted from the text parsing part 320 and outputs it to the voice generating part 324 using voice character data contained in the header data of the voice feature data which was inputted from the voice font database part 330 and switched by the voice font switching part 326.

The voice generating part 324 correlates phonemes contained in the voice feature data which was inputted from the voice font database part 330 and switched by the voice font switching part 326 with the pronounced data inputted from the text parsing part 320 through the rhythm control part 322 for output to the voice output part 38.

The voice output 38 generates a voice signal having a characteristic indicated by the voice feature and the voice character data given by the phonemes corresponding to the pronounced data which is inputted from the voice generating part 324 to outputs it to the exterior.

Figure 4:
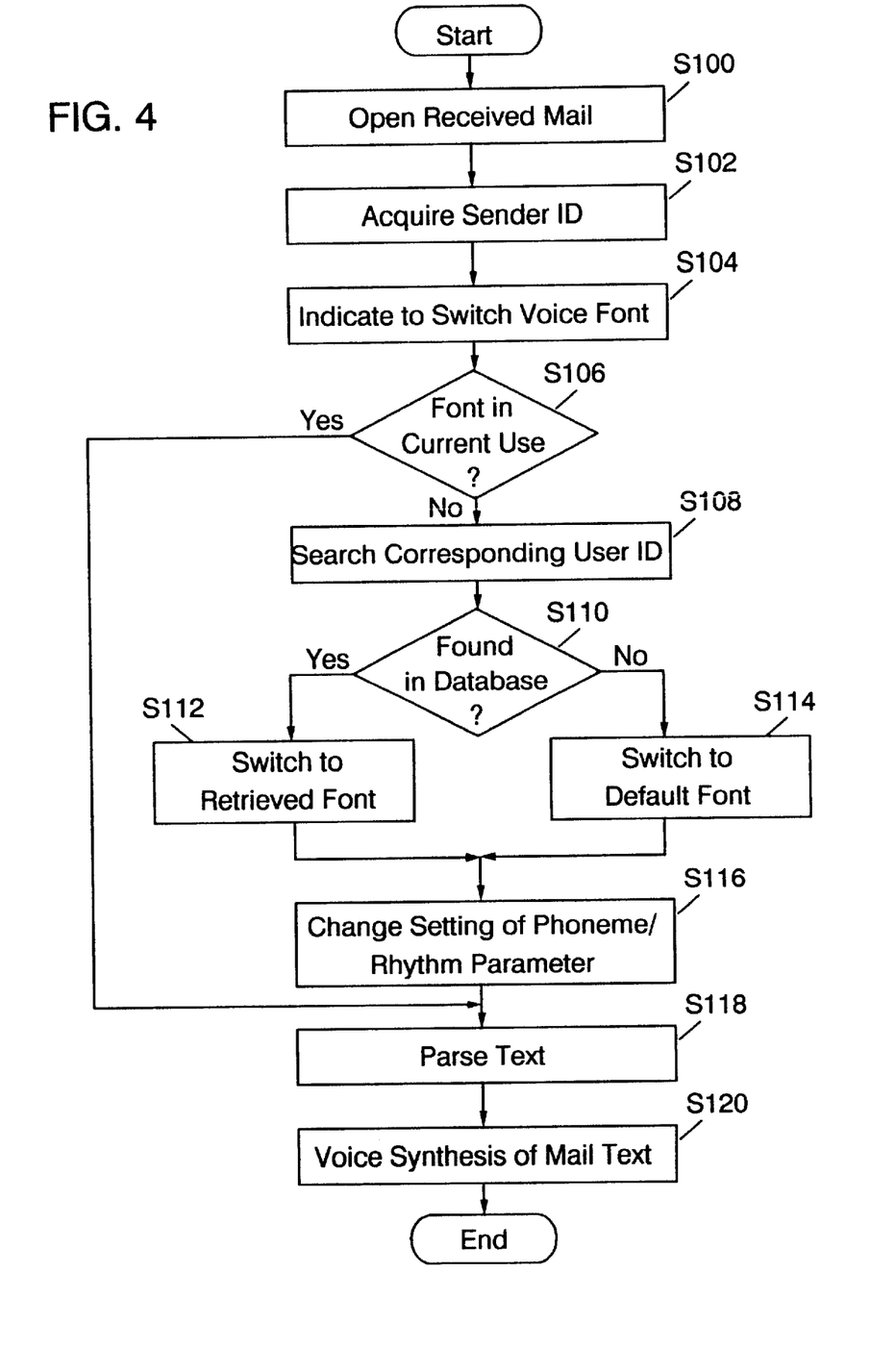
FIG. 4 is a flow chart showing voice output process of the terminal device shown in FIG. 1 and FIG. 2.

The process of outputting in a voice the text of the electronic mail which the terminal device 3b-1 received from the terminal device 3a-1 will be further explained hereunder with reference to FIG. 4.

As shown in FIG. 4, in step 100 (S100), the reception part 30 of the terminal device 3b-1 receives an electronic mail from the terminal device 3a-I through the communication networks 20a, 20b, opens the received electronic mail, separates the sender ID from the header of the electronic mail for output to the voice font switching part 326 and separates the text for output to the text parsing part 320 of the voice synthesizing part 32.

In step 102 (S102), the voice font switching part 326 acquires the sender ID inputted from the reception part 30.

In step 104 (S104), the voice font switching part 326 instructs the voice font searching part 328 to switch the voice feature data.

In step 106 (S106), the voice font switching part 326 causes the rhythm control part 322 and the voice generating part 324 to determine whether or not the voice feature data which is set for processing a voice output is the voice feature data which is set for use in the process (currently in use) and proceeds to the step S108 if it is not the voice feature data in current use.

In step 108 (S108), the voice font switching part 326 controls the voice font searching part 328 to have it search the voice feature data corresponding to the user ID of the sending side (sender ID) in the voice font database part 330.

In step 110 (S110), the voice font switching part 326 determines whether or not there is voice feature data corresponding to the sender ID in the voice font database part 330 based on the result of the search by the voice font searching part 328 and proceeds to the process in the step S111 when there is voice feature data corresponding to the sender ID while it proceeds to the step S114 when there is no voice feature data corresponding to the sender ID.

In step 112 (S112), the voice font switching part 326 controls the voice font searching part 328 to have it supply the voice feature data corresponding to the sender ID from the voice font database part 330 to the rhythm control part 322 and the voice generating part 324 while it controls the rhythm control part 322 and the voice generating part 324 so as to switch the voice feature data so far used to the voice feature data corresponding to the sender ID obtained as a result of the search by the voice font searching part 328.

In step 114 (S114), the voice font switching part 326 controls the voice font searching part 328 to have it supply the default voice feature data from the voice font database part 330 to the rhythm control part 322 and the voice generating part 324 while it controls the rhythm control part 322 and the voice generating part 324 so as to switch the voice feature data so far used to the default voice feature data.

In step 116 (S116), the rhythm control part 322 and the voice generating part 324 changes the setting so that the phonemes and the rhythm parameter of the voice feature data which is newly supplied from the voice font database part 330 is used for processing in place of the phonemes and the rhythm parameter of the voice feature data so far used for processing.

In step 118 (S118), the text parsing part 320 parses the text of the received electronic mail to generate pronunciation data for output to the rhythm control part 322.

In step 120 (S120), the rhythm control part 322 and the voice generating part 324 correlates the pronunciation data generated by the test parsing part 320 to the phonemes of the voice feature data which is set for use in the process according to the control by the voice font switching part 326 and further adds voice character data for output to the voice output part 38. The voice output part 38 synthesizes a voice signal having a characteristic indicated by the voice feature given by the phonemes inputted from the voice generating part 324 and a characteristic indicated by the voice character data for output to the exterior.

Effect by using the voice Mail system 1

As described in the above, phonemes and voice character data are supplied to each of terminal devices 3 as voice feature data in the form already correlated to the user ID according to the voice mail system 1 shown as the first embodiment of the invention. Therefore, each of terminal devices 3 are capable of voice outputting a mail in a voice of a feature corresponding to the sender ID without a table which correlates phonemes and voice character data to the user ID.

Further, because voice feature data can he supplied through the recording medium 340 or the communication networks 20a, 20b, same voice feature data may be supplied to all terminal devices 3 in the voice mail system 1. In addition, the voice feature data in all the terminal devices 3 in the voice mail system 1 may be updated all together by supplying updated voice feature data via a recording medium 340 and the like.

Further, because voice feature data which correlates phonemes and voice character data to a user ID which is unique in the network is generated in the voice mail system 1, it is assured to assign an identifier to the voice feature data of each user.

In addition, because the voice feature data can be simply generated by using the voice font generator device 36 and set in all the terminal devices 3 in the voice mail system 1, care by a system administrator is not required. Conversely, because it is not necessarily needed to coincide the voice feature data in all the terminal devices 3, it is possible to change the tone of the voice used in the voice output as the case may be such as voice outputting an electronic mail in a casual tone to the terminal device 3 of a friend while voice outputting the electronic mail in a tone suitable to a business to the terminal device 3 which is related to a business by changing the setting of the voice character data shown in the Table 1 corresponding to parties to be set.

Alternative Embodiment

While only the operation of the terminal device 3b-1 in the communication network 2a and the terminal device 3b-1 in the communication network 2b was described in the above embodiment, the operation is the same for other terminal device 3 and transmission, reception and voice output of an electronic mail can be done among any terminal device 3.

Further, while the case where an electronic mail is transmitted over a plurality of networks among each of terminal devices 3 in the communication networks 2a, 2b was described in the above embodiment, the configuration may be changed so that transmission, reception and voice output of an electronic mail among the terminal device 3 can be done only in the form they are enclosed in the networks 2a, 2b, respectively.

While the case where the reception part 30 outputs only the text of an electronic mail to the text parsing part 320 was described in the above embodiment, the configuration may be changed so as to output the entire electronic mail to the text parsing part 320 and to voice output the sender ID and destination ID together with the text.

Incidentally, the voice character data shown in the Table 1 is for exemplary purpose and other data such as data giving a dialect may be added to the voice character data or unnecessary data may be omitted.

Also, the configuration of the terminal device 3 shown in FIG. 2 is for exemplary purpose and components of the terminal device 3 may be replaced with other equivalent means so long as they give the same function and performance and further may be structured either by a hardware or a software.

The Second Embodiment

The second embodiment of this invention will now be described hereunder.

In the voice mail system 1 shown as the first embodiment, each terminal device 3 (3a-1, ... 3a-m, 3b-1, ... 3b-n) was configured so as to records and controls voice feature data and voice outputs an electronic mail. However, in the voice mail system 1, a voice output function of an electronic mail is not available with the use of a conventional telephone set which does not have a voice synthesizing function.

From such point of view, the communication network 2c shown as the second embodiment is a further improvement to the voice mail system 1 so as to provide a voice output function of a text to a conventional telephone set.

Configuration of the Communication Network 2c

Figure 5:
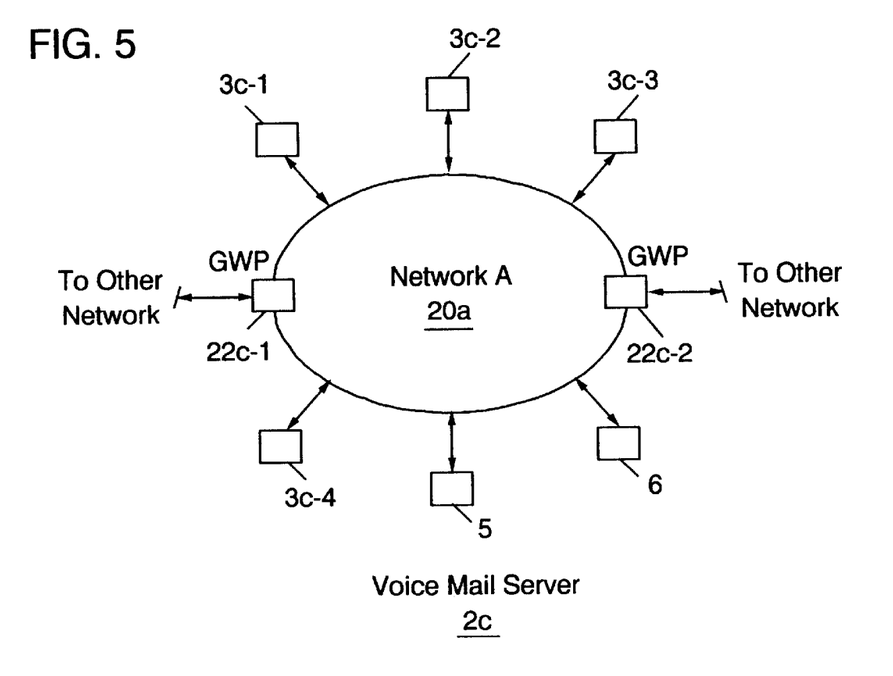
FIG. 5 is a diagram showing the configuration of a communication network shown as a second embodiment of this invention.

FIG. 5 is a diagram showing the configuration of the communication network 2c shown as the second embodiment of this invention.

As shown in FIG. 5, the communication network 2c includes a gateway processors 22c-1,22c-2 connected to the communication network 20c, terminal devices 3c-1, ... 3c-p (the case where p=4 is shown in FIG. 5), an electronic mail server 5 and a telephone set 6 as communication nodes.

In FIG. 5, the communication network 20c of the communication network 2c corresponds to the communication network 20a, 20b of the voice mail system 1 shown in FIG. 1, the gateway processors 22c-1, 22c-2 correspond to the gateway processor 22a-1, 22a-1, 22b-1, 22b-2, and the terminal devices 3c-1, ... 3c-p (like the terminal devices 3a-1, ... 3a-m, 3b-1, ... 3b-n, referred to as terminal device 3 for simplicity) correspond to the terminal devices 3a-1, 3a-m, 3b-1 ... 3b-n shown in FIG. 1 and FIG. 2. These corresponding components are of the same configuration and have the same function.

The gateway processor 22c provides the user with a voice output function of a text of an electronic mail which is similar to the voice mail system 1 and also provides a telephone set 6 which does not have a voice synthesizing function with a voice output function of a text using voice feature data individual to each of users.

Components of the Communication Network 1c

Among the components of the communication network 2c, the electronic mail server 5 and the telephone set 6 which are different from the components of the voice mail system 1 (FIG. 1) will now be described hereunder.

Telephone Set 6

The telephone set 6 is, for example, an analog telephone set having a DTMF (dual tone multi frequency) transmission function or an ISDN terminal and sends/receives a voice signal between the terminal device 3 and other telephone set (not shown) via the communication network 20c, and sends a user ID, a pass word and other operational data to the electronic mail server 5 in the form of DTMF or digital data.

Electronic Mail server 5

Figure 6:
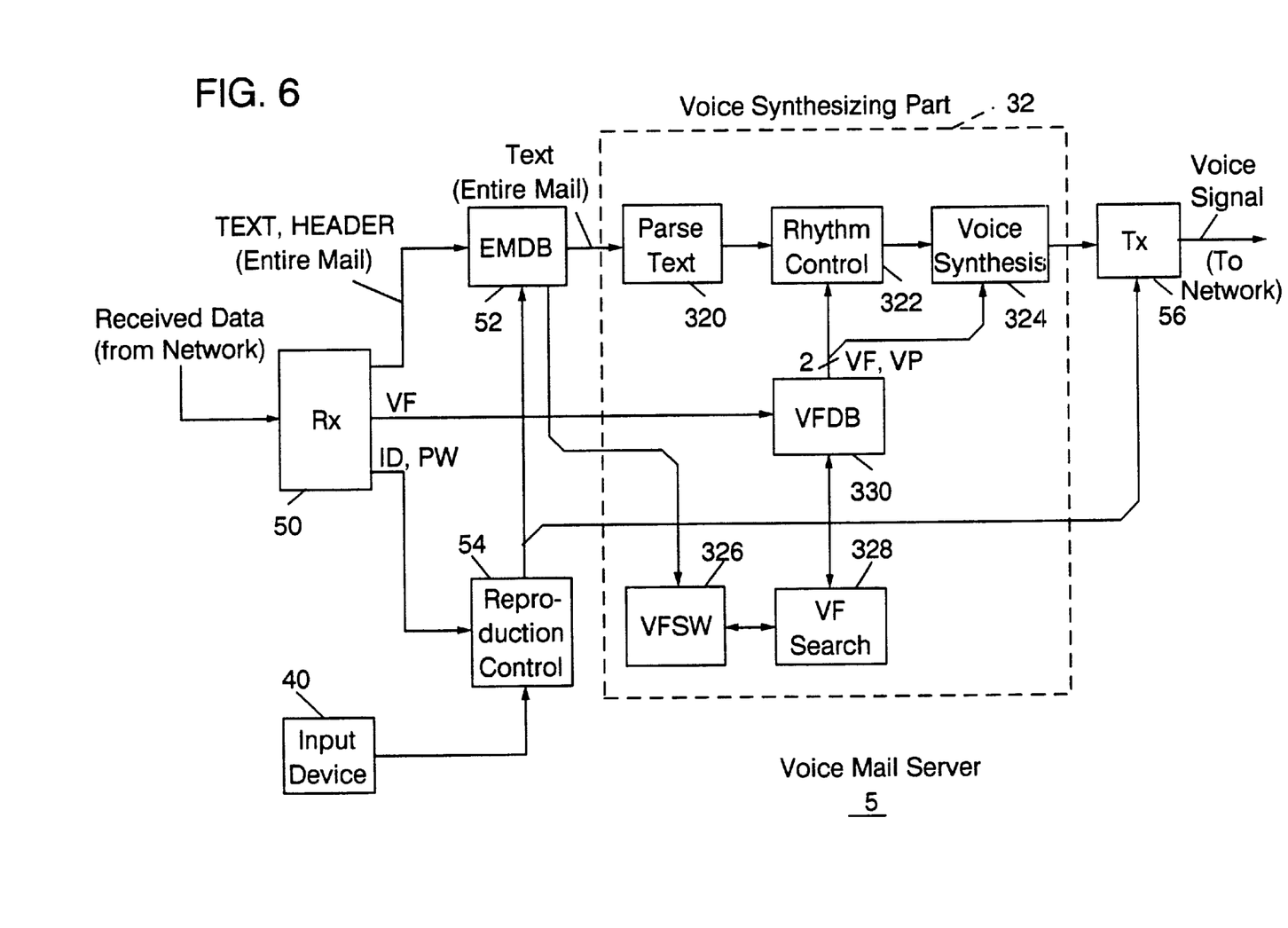
FIG. 6 is a diagram showing the configuration of a voice mail server shown in FIG. 5.

The configuration of the electronic mail server 5 is now described hereunder with reference to FIG. 6.

FIG. 6 is a diagram showing the configuration of the electronic server 5 shown in FIG. 5.

As shown in FIG. 6, the electronic mail server 5 comprises a voice synthesizing part 32, an input device 40, a reception part 50, an electronic mail database (EMDB) 52, a reproduction control part 54, and a transmission part 56.

In FIG. 6, among components of the electronic mail server 5, those components which are same as those of the terminal device 3 shown in FIG. 1 and FIG. 2 are referred to by the same reference numbers.

The mail server 5 stores and controls the text and the voice feature data of the electronic mail received from the terminal device 3 through the communication network 20c and generates a voice signal which reads the text in a voice of a feature corresponding to the sender ID of the electronic mail for transmission to the telephone set 6.

Components of the Electronic Mail Server

Reception Part 50

In the electronic mail server 5, the reception part 50 corresponds to the reception part 30 of the terminal device 3 and comprises a receiving part of a TA, a modem or a LAN connection board depending of the type of the communication network 20c like the reception part 30. The electronic mail server 5 receives an electronic mail inputted from the communication network 20c as received data to open it and outputs the opened electronic mail (text and header) to the electronic mail database 52 for output to the voice font switching part 326 of the voice synthesizing part 32.

Further, the reception part 50 separates the voice feature data (VF) from the electronic mail for output to the voice font database part 330 when the received electronic mail contains voice feature data.

In addition, the reception part 50 further includes a DTMF receiver if needed and receives from the telephone set via the communication network 20c a user ID and a pass word inputted in the form of digital data or DTMF, and operational data indicating voice output of a text to the electronic mail server 5 for output to the reproduction control part 54.

Electronic Mail Database 52

The electronic mail database 52 stores and controls the text and header of an electronic mail inputted from the reception part 50 and outputs the text of the stored electronic mail to the text parsing part 320 or outputs the sender ID contained in header of the electronic mail to the voice font switching part 326 under the control by the reproduction control part 54.

Reproduction Control Part 54

The reproduction control part 54, upon input of operation data indicating voice output of the text from the reception part 50, checks the correlation of the user ID to the pass word inputted together and, only when the user ID correctly corresponds to the password, controls the electronic mail database 52 to have it search an electronic mail which contains inputted user ID in the header as a destination address, outputting the electronic mail found is a result of the search to the text parsing part 320 and the voice font switching part 326.

Further, the reproduction control part 54 controls the transmission part 56 to have it send a voice signal generated by the voice synthesizing part 32 and the transmission part 56 to the telephone set 6 or other terminal device 3 via the communication network 20*c*.

Transmission Part 56

The transmission part 56 corresponds to the voice output part 38 and the transmission part 44 in the terminal device 3 and comprises a transmission part of a TA which is capable of voice communication or a transmission part of an analog telephone network interface The transmission part 56 generates a voice signal which reads the content of the text of the electronic mail in each corresponding voice feature from the phonemes and voice character data inputted from the voice generating part 324 under the control of the reproduction control part 54 in the manner similar to the voice output part 38 and sends the voice signal to the telephone set 6 via the communication network 20*c* like the transmission part 44.

Operation of the Electronic Mail Server 5

The operation of the communication network 2*c* is now described by taking as an example a case where the electronic mail server 5 stores and control an electronic mail sent by the terminal device 3*c*-1 to voice output according to user's manipulation of the telephone set 6.

Reception of Electronic Mail

In the communication network 2*c*, when the terminal device 3*c*-1 sends an electronic mail to the electronic mail server 5 through the communication network 20*c*, the reception part 50 of the electronic mail server 5 receives an electronic mail which is inputted through the communication network 20*c* and outputs it to the electronic mail database 52.

The electronic mail database 52 stores and controls the inputted electronic mail.

Voice Output of Text

The user of the telephone set 6 calls the electronic mail server 5 from the telephone set 6 and sets up a communication channel between the telephone set 6 and the electronic mail server 5. In addition, the user manipulates the ten key of the telephone set 6 to input a code (manipulation data) which requests the electronic mail sever 5 to read the electronic mail and then continues to input a user ID (destination ID) contained in the electronic mail received by the electronic mail server 5 and a pass word which is set in the reproduction control part 54 of the electronic mail server 5 that is correlated in advance to the destination ID. The telephone set 6 sends the manipulation data, the user ID and the pass work to the electronic mail server 5 in the form of DTMF or digital datathrough the communication network 20.

The reception part 50 of the electronic mail server 5 searches the electronic mail from the terminal device 3*c*-1 which is stored in the electronic mail database 52 based on the manipulation data, the user ID and the pass word inputted from the telephone set 6 and controls the electronic mail database 52 to have it output the text of the electronic mail found as a result of the search to the text parsing part of the voice synthesizing part 32 and the sender ID contained in the header to the voice font switching part 326.

The voice synthesizing part 32 and the transmission part 56 generates a voice signal which reads the content of the text inputted from the electronic mail database 52 in a voice feature of the voice feature data corresponding to the sender ID in the header and sends it to the telephone set 6 through the communication network 20*c*. The telephone set 6 outputs the voice signal received from the terminal device 30*c*-1 through the communication network 20*c* to the user.

As described in the above, a voice output function of a text of an electronic mail is provided to the user as in the voice mail system 1 (FIG. 1) and a voice output function of a text using voice feature data individual to each of users is provided to a telephone set 6 which does not have a voice synthesizing function according to the communication network 2*c*.

Setting the voice feature data in the electronic mail server 5 by the terminal device 3 in the communication network 2*c* through the communication network 20*c* is similar to the setting of the voice feature data between the terminal devices 3 in the voice mail system 1.

While the description of operation of the second embodiment in the above was for the case where the terminal device 3*c*-1, the electronic mail server 5 and the telephone set 6 communicate each other, a similar communication may be done among either one of the terminal devices 3*c*-1, . . . 3*c*-p, the electronic mail server 5 and the telephone set 6.

The electronic mail server 5 shown in the second embodiment may be also shared among a plurality of communication networks.

In addition, the number of the telephone sets 6 in the communication network 2*c* is not listed to 1 and a plurality of telephone sets may be connected to the communication network 2*c*. Further, by adding transmission function and a voice communication function of manipulation data, a user ID and a pass word to the terminal device 3, a function corresponding to a telephone set 6 of the electronic mail server 5 may be provided to the terminal device 3.

Further, a modification similar to the voice mail system 1 may be applied to the communication network 2*c*, for example, to modify the configuration such that the electronic mail database 52 and the reception part 50 output the entire electronic mail and voice output the text together with the sender ID and the destination ID. It is also possible to add the electronic mail server 5 to the voice mail system 1, to connect the voice mail system 1 and communication network 2*c* together and to combine the voice mail system 1 with the communication network 2*c*.

The Third Embodiment

The third embodiment of this invention is now described hereunder.

A mail can be voice outputted in a voice feature unique to each sender of the mail by voice mail system shown in the first and the second embodiments.

However, if the voice feature data is set in the terminal device of other person in the above voice mail system, it is difficult to control and limit it and there is a possibility that the author of the voice feature data subjects to a disadvantage due to an unauthorized use by a third party.

Further, if an electronic mail is sent to customer's terminal device in which voice feature data of a casual tone is set, the electronic mail will be voice outputted to the customer in a unsuitable tone by an erroneous operation by a sender or an unauthorized use. In such case, it is unsuitable to manipulate the terminal device of other person to modify or delete the voice feature data so that it is necessary to limit the usable range of the voice feature data by some suitable method.

From the viewpoint of preventing the above described inexpedience, the third embodiment of this invention expands the operation of the voice font switching part 326 so as to limit the time limit of validity and the usable range of the voice feature data Expansion of Voice Feature Data In the third embodiment, the header data of the voice feature data (FIG. 1) shown in the Table 1 in the first embodiment is added with data given in the table 2 below which enables the use of voice feature data defining the time limit of use utilizing a clock function which the terminal device 3 has as a function of a conventional computer, and use restrictions of voice feature data by the destination ID (FIG. 3) of the electronic mail.

TABLE 2

(Data added to the header data of voice feature data)

| TCHAR | szReceiverMailID [TSSI_MAILIDLEN]; |
| WORD | wLimitFlag; |
| TCHAR | szExpireDate [TSSI_DATELEN] | where, "szReceiverMailID (object limited/object not limited ID)" may set a plurality of destination ID (FIG. 3) and the electronic mail containing the destination ID which is set here is the object of use restriction of voice feature data by the sender ID.

"wLimitFlag (limiting method flag)" includes "VFLIMIT_OR" and "VFLIMIT_XOR". "VFLIMIT_OR" prohibits the use of voice feature data only for the destination ID which is set as "szReceiverMailID (object limited/object not limited ID)" while "VFLIMIT_XOR" prohibits the use of voice feature data only for the destination ID other than those which is set as "szReceiverMailID (object limited/object not limited ID)".

"szExpireDate (time limit data)" is set, for example, to 19971231 (Dec. 31, 1997) and indicates the time limit if validity. When there is no setting of "szExpireDate (time limit data)", the time limit of validity of the voice feature data is unlimited.

Operation of the Voice Mail System Where the Use of Voice Feature Data is Limited The operation in which the terminal device 3b-1 receives an electronic mail from the terminal device 3a-1 and voice outputs the text of the electronic mail using voice feature data with use restriction in the voice mail system 1 (FIG. 1) is now described with reference to FIG. 7.

Figure 7:
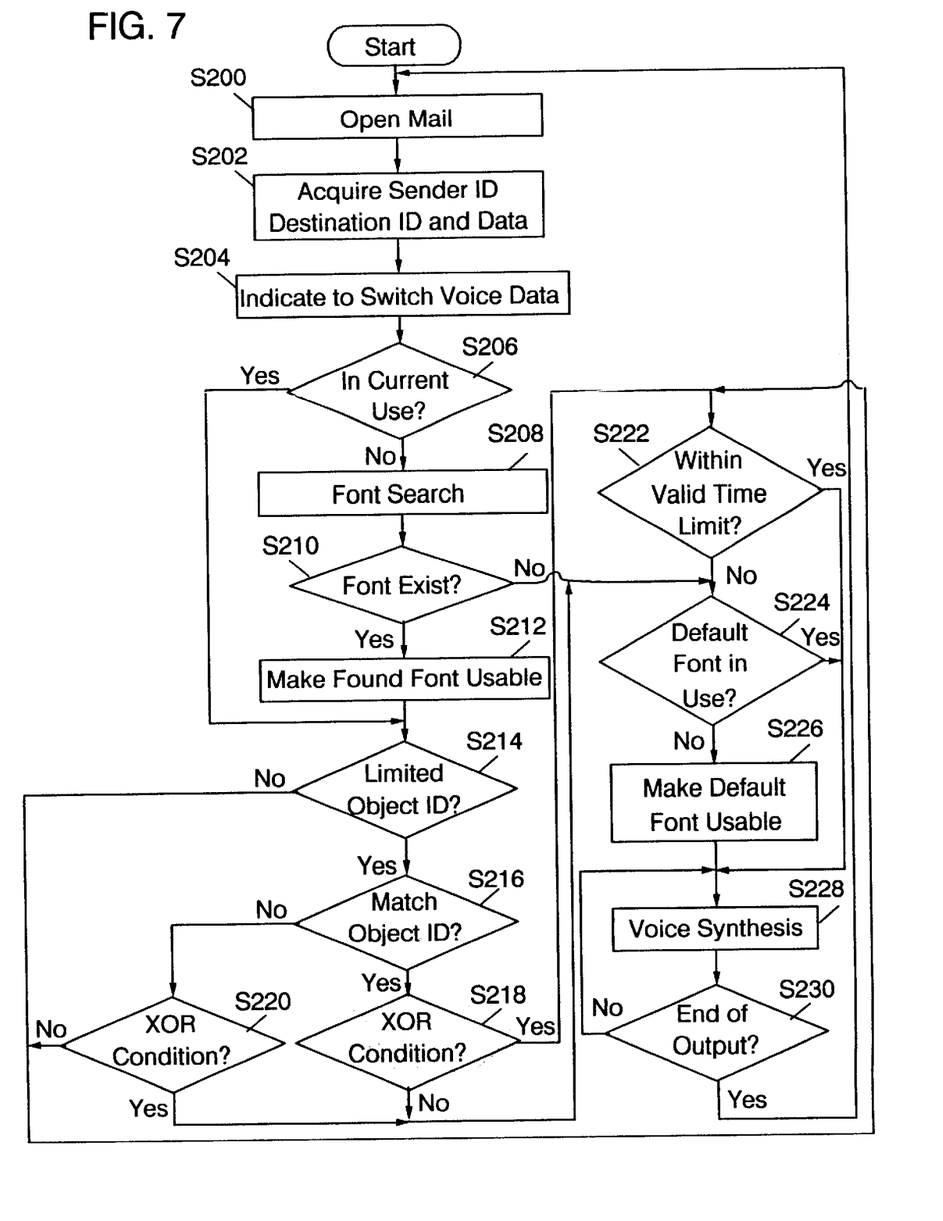
FIG. 7 is a flow chart showing a case where the terminal device performs voice output process using voice feature data with use restriction.

FIG. 7 is a flow chart showing the case where the terminal device 3 (3b-1 ; FIG. 1, FIG. 3) processes voice output using voice feature data with use restriction.

As shown in FIG. 7, in step 200 (S200), the reception part 30 of the terminal device 3b-1 receives an electronic mail from the terminal device 3a-1 through the communication network 20a, 20b to open it and separates the sender ID, the destination ID and the transmission time (year/month/date/hour/minute of transmission) of the electronic mail from the header of the electronic mail to output them to the voice font switching part 326 while separating the text to output it to the text parsing part 320 of the voice synthesizing part 32.

In step 202 (S202), the voice font switching part 326 acquires the sender ID, the destination ID and the transmission time from the reception part 30.

In step 204 (S204), the voice font switching part 326 instructs the voice font searching part 328 to switch the voice feature data.

In step 205 (S206), the voice font switching part 326 causes the rhythm control part 322 and the voice generating part 324 to determine whether or not the voice feature data which is set for processing voice output and is in a usable condition is the voice feature data currently in use, and if it is the voice feature data in current use proceeds to the process of S214 while if it is not the voice feature data currently in use proceeds to S208.

In step 208 (S208), the voice font switching part 326 controls the voice font searching part 328 to have it search the voice feature data corresponding to the sender ID inputted from the reception part 30 in the voice font database part 330.

In step 210 (S210), the voice font switching part 326 determines whether or not there is voice feature data corresponding to the sender ID in the voice font database part 330 based on the result of the search by the voice font searching part 328 and proceeds to S212 if there is voice feature data corresponding to the sender ID while it proceeds to S224 if there is no voice feature data corresponding to the sender ID.

In step 212 (S212), the voice font switching part 326 controls the voice font searching part 328 to have voice feature data corresponding to the sender ID supplied to the rhythm control part 322 and the voice generating part 324 from the voice font database part 330 to make it usable and controls the rhythm control part 322 and the voice generating part 324 to switch to the voice feature data corresponding to the sender ID obtained as a result of the search by the voice font searching part 328 in place of the voice feature data so far having been used.

In step 214 (S214), the voice font switching part 326 refers to the portion of "object limited/object not limited" data (Table 2) of the header data of the voice feature data which is in a usable condition and determines whether or not the destination ID is set, and if the destination ID is set in the "object limited/object not limited" data proceeds to the process of S216 while it proceeds to S222 if the destination ID is not set.

In step 216 (S216), the voice font switching part 326 determines whether or not the electronic mail address of the terminal device 3b-1 matches any of the destination IDs set in the "object limited/object not limited" data and if it matches proceeds to S218 while if it does not match proceeds to S220.

In step 218 (S218), the voice font switching part 326 checks the restriction flag of the header data of the voice feature data and if the restriction flat is VFLIMIT_XOR proceeds to S222 while it proceeds to S224 if the flag is not VFLIMIT_XOR (the flag is VFLIMIT_OR).

In step 220 (S220), the voice font switching part 326 checks the restriction flag of the header data of the voice feature data and if the restriction flag is VFLIMIT_XOR proceeds to S224 while it proceeds to S222 if the flag is not VFLIMIT_XOR (the flag is VFLIMIT_OR).

In step 222 (S222), the voice font switching part 326 compares the time limit data of the voice feature data with the current year/month/day indicated by the clock function provided by the system of the terminal device 3b-1 and proceeds to S228 if the current year/month/day is within the time limit of validity while it proceeds to S224 if the current year/month/day is outside the time limit.

Instep 224 (S224), the voice font switching part 326 determines whether or not the voice feature data in a usable condition (in current use) is a default voice feature data and proceeds to S228 if the voice feature data in use is the default voice feature data while it proceeds to S226 if the voice feature data in use is not the default voice feature data.

In step 226 (S226), the voice font switching part 326 controls the voice font searching part 328 to have it supply the default voice feature data from the voice font database part 330 to the rhythm control part 322 and the voice generating part 324 and controls the rhythm control part 322 and the voice generating part 324 to switch to the default voice feature data in place of the voice feature data so far having been used.

In step 228 (S228) and step 230 (S230), the rhythm control part 322 and the voice generating part 324 correlate phonemes of the voice feature data which is set for use in processing to the pronunciation data generated by the text parsing part 320 under the control of the voice font switching part 326 until the output of the contents of all texts end and further add voice character data for output to the voice output part 38. The voice output part 38 synthesizes a voice signal having a characteristic indicated by the voice feature given by the phonemes inputted from the voice generating part 324 and the voice character data for output to the exterior.

While the third embodiment was described for a case where a text is voice outputted using voice feature data with use restriction in the voice mail system 1 (FIG. 1: the first embodiment), it should be understood that the method of voice outputting the text using voice feature data with use restriction shown in the third embodiment may be also applicable to the communication network 2c (FIG. 5: the second embodiment).

Further, while a case where the time limit of use of the voice feature data is set by data unit was described, the voice output method shown in the third embodiment may be modified such that the use limit is set in other unit like hour/minute and the use limits controlled by the unit which is set.

Further, while a case where only expiration time of the use limit of the voice feature data is set in the voice feature data was shown, the voice output method of the third embodiment may be modifier such that a start time and an expiration time are set to make the voice feature data usable only within the set range.

Also, the alternative embodiments shown in the first and the second embodiments are similarly applicable to the voice output method shown in the third embodiment.

As described in the above, a text can be voice outputted in a voice feature unique to each of users who sent electronic mails while the voice feature in the voice output of the electronic mail is easily set up according to the voice mail system, the voice synthesizer device and the method therefor.

Further, according to the voice mail system, the voice synthesizer device and the method therefor, a text can be voice outputted in a voice feature unique to each of users who sent electronic mails without adding data (voice feature data) indicating the voice feature in the voice output to each of electronic mails.

Further, according to the voice mail system, the voice synthesizer device and the method therefor, same voice feature data may be shared by any number of sender IDs and, even when a same user has a plurality of IDs, waste of resources of the terminal device caused by registering a plurality of same voice feature data is prevented so that many voice feature data may be registered in each terminal device.

Further, according to the voice mail system, the voice synthesizer device and the method therefor, this invention can limit the use of the voice feature data to a given time period even after the voice feature data have been spread over the communication network and can prevent a disadvantage of the author due to unauthorized use by a third party from taking place.

Further, according to the voice mail system, the voice synthesizer device and the method therefor, the usable range of the voice feature data may be limited in order to prevent unsuitable use of the voice feature data.

It should be understood that various modifications may be made by those skilled in the art without departing from the spirit and scope of the invention.

We claim:

1. A voice mail system comprising a plurality of terminal devices connected through a network of communications nodes, in which said terminal devices each comprises:

voice feature control means for controlling voice feature data which indicates voice features of a plurality of voices in correlation with one or more identifiers which are unique within the network;

mail reception means for receiving a mail containing at least a communication message and said identifier;

voice synthesizer means for synthesizing a voice which represents the content of the communication message contained in the received mail in a voice feature indicated by said voice feature data which is controlled in correlation with said identifier contained in the received mail;

voice output means for outputting said synthesized voice wherein each of said communication nodes comprises clock means for measuring an operating time;

each of said voice feature data including time limit data indicating a limit of using the voice feature data; and said voice synthesizer means synthesizing the voice using said voice feature data only when said operating time is within the use limit indicated by said time limit data contained in said voice feature data.

2. A voice mail system of claim 1 in which each of said terminal devices is provided with mail sending means for sending said mail to other communications node through said network.

3. A voice mail system of claim 1 in which;

said mail contains at least a communication message and said identifier of the sending party, and said voice synthesizer means synthesizing a voice representing the content of the communication message contained in said received mail in a voice feature which said voice feature data indicates in correlation with said identifier of the sending party contained in said received mail.

4. A voice mail system of claim 1 further comprising voice data extracting means for extracting voice feature data indicating each of voices inputted and sending it to each of said communication nodes through said network in correlation with one or more identifiers each being unique within said network, and said voice feature data control means receiving said extracted voice feature data through the network for controlling the received voice feature data in correlation with one or more identifiers which are unique within the network.

5. A voice mail system of claim 1 which;

said mail containing an identifier of the destination, each of said voice feature data containing use permission data which indicates the identifier of the destination which is permitted to use that voice feature data, and said voice synthesizer means synthesizing the voice using said voice feature data when the identifier of the destination contained in said mail is the identifier of the destination which said use permission data permits to use.

6. A voice mail system comprising one or more terminal devices and one or more voice mail server devices connected through a network as communication nodes, in which said voice mail server device comprises:

voice feature control means for controlling voice feature data for voice features of a plurality of voices in correlation with one or more identifiers which are unique within the network;

mail reception means for receiving a mail containing at least a communication message and said identifier;

voice synthesizer means for synthesizing a voice which represents the content of the communication message contained in the received mail in a voice feature indicated by said voice feature data which is controlled in correlation with said identifier contained in the received mail;

voice output means for outputting said synthesized voice to one or more of said plurality of terminal devices in response to a request from one or more of said plurality of terminal devices;

wherein each of said communication nodes comprises clock means for measuring an operating time;

each of said voice feature data including time limit data indicating a limit of using the voice feature data; and said voice synthesizer means synthesizing the voice using said voice feature data only when said operating time is within the use limit indicated by said time limit data contained in said voice feature data.

7. A voice mail system of claim 6 in which each of said terminal devices is provided with mail sending means for sending said mail to other communication node through said network.

8. A voice mail system of claim 6 in which;

said mail contains at least a communication message and said identifier of the sending party, and said voice synthesizer means synthesizing a voice representing the content of the communication message contained in said received mail in a voice feature which said voice feature data indicates in correlation with said identifier of the sending party contained in said received mail.

9. A voice mail system of claim 6 further comprising voice data extracting means for extracting voice feature data indicating each of voices inputted and sending it to each of said communication nodes through said network in correlation with one or more identifiers each being unique within said network, and said voice feature data control means receiving said extracted voice feature data through the network for controlling the received voice feature data in correlation with one or more identifiers which are unique within the network.

10. A voice mail system of claim 6 in which;

said mail containing an identifier of the destination, each of said voice feature data containing use permission data which indicates the identifier of the destination which is permitted to use that voice feature data, and said voice synthesizer means synthesizing the voice using said voice feature data when the identifier of the destination contained in said mail is the identifier of the destination which said use permission data permits to use.

11. A voice synthesizer means for synthesizing a voice of a communication message of a mail containing at least a communication message and an identifier comprising:

voice feature data control means for controlling voice feature data for voice features of a plurality of voices in correlation with one or more identifiers which are unique within the network which transmits said mails;

voice synthesizer means for synthesizing a voice representing the content of a communication message contained in the received mail in a voice feature indicated by said voice feature data which is controlled in connection with said identifier; and time limit data means for limiting the use of voice feature data for at least one of the synthesized voices to an operating time within a time use limit period.

12. A voice mail communication method comprising:

controlling voice feature data indicating each voice feature of a plurality of voices in correlation with one or more identifiers which are unique within a network;

receiving a mail containing at least a communication message and one or more identifiers;

synthesizing a voice representing the content of a communication message contained in the received mail in a voice feature indicated by said voice feature data which is controlled in correction to said identifier contained in said received mail; and providing permission use data in the voice feature data which indicates identifiers of destinations in the network which are permitted to use the voice feature data.

13. A voice synthesizing method for synthesizing a voice of a communication message of a mail which contains at least a communication message and an identifier comprising:

generating voice feature data by users speaking into a microphone and distributing the voice feature data to destinations within a network;

controlling voice feature data indicating each voice feature of a plurality of voices in correlation with one or more identifiers which are unique within the network which transmit each of said mails providing permission use data in the voice feature data for a voice which indicates the identifiers of destinations in the network permitted to use the voice feature data; and synthesizing a voice representing the content of a communication message contained in the received mail in a voice feature indicated by said voice feature data which is controlled in correlation to said identifier.

14. The voice synthesizing method of claim 10 including the step of limiting the use of a given voice feature data to a period of time within a time use period specified in that given voice feature data.

15. A computer readable recording medium which records therein a program for causing the computer to execute the steps of:

generating voice feature data by users speaking into a microphone;

distributing the generated voice feature data to destinations within a network;

controlling each voice feature data indicating each voice feature of a plurality of voices in correlation with one or more identifiers which are unique within the network;

providing permission data in the voice feature data which limits use of the voice feature data to only some of the destinations in the network;

receiving a mail containing at least a communication message and one or more identifiers; and synthesizing a voice representing the content of a communication message contained in the received mail in a voice feature indicated by said voice feature data which is correlated to said identifier and the voice permission data contained in said received mail.

16. The computer readable recording medium of claim 11 including the step of limiting the use of a given voice feature data to a period of time in a time use period specified in the given voice feature data.

* * * * *